A. DeWITZLEBEN.
Ball Screw for Fire-arms.

No. 46,220.

Patented Feb. 7, 1865.

Witnesses

Inventor:
Arthur de Witzleben

UNITED STATES PATENT OFFICE.

ARTHUR DE WITZLEBEN, OF WASHINGTON, DISTRICT OF COLUMBIA.

IMPROVEMENT IN BALL-SCREWS FOR FIRE-ARMS.

Specification forming part of Letters Patent No. 46,220, dated February 7, 1865.

*To all whom it may concern:*

Be it known that I, ARTHUR DE WITZLEBEN, of Washington, District of Columbia, have invented a new and useful Improvement in Implements for Removing Balls or Projectiles from Fire-Arms; and I do hereby declare that the following is a full, clear, and exact description of the same, reference being had to the annexed drawings, Figures 1, 2, 3, 4, 5, and 6, making a part of this specification.

Figure 1:
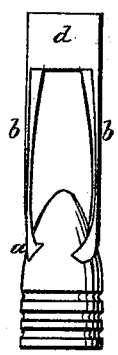
Figure 2:
Figure 3:
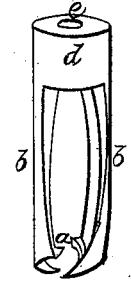
Figure 4:
Figure 5:
Figure 6:

Of iron or steel I construct a cylinder-shaped fork, Figs. 1, 2, and 3, the tines $b\ b$ of which terminate in concave chisel and wedge shaped blades or jaws, whose points in their relative positions form a powerful concave screw, the thread $a$ of which is in the form of a shoulder or barb.

This instrument or machine readily adapts itself to the ball or projectile, against which it is pressed with a twisting or circular motion, with the aid of a rod attached to it by the female screw $e$, Fig. 3, cutting into the ball or projectile (see Figs. 1 and 2) beyond the barb or shoulder $a$, securing a sufficient grip (see $ff$, Fig. 6) or purchase to enable the operator to wrench the ball or projectile from the firearm.

I consider my invention as important and a valuable improvement on that of John J. Alisces, No. 44,586, patented October 11, 1864, from the fact I combine with the principle of the spring-nippers, which governs his invention, that of the concave or double screw with wedge-shaped points, the shoulders $a\ a$ or barbed threads of which, forming the lifting-power, render it impossible for the implement to slip off of the projectile—a failing common with that of Mr. Alisces.

What I claim as my invention, and wish to secure by Letters Patent, is—

The tines or jaws $b\ b$, with their threads or shoulders $a\ a$, forming in combination the concave screw, for the uses and purposes as above described.

ARTHUR DE WITZLEBEN.

Witnesses:
W. L. WOODS,
J. M. BECKER.